INVENTORS.
NORFORD L. OATES
ROBERT I. KARR
BY
Robert W. Beach
ATTORNEY

July 22, 1969  N. L. OATES ET AL  3,456,287
FISH-CLEANING MACHINE DRIVE MECHANISM
Filed July 28, 1967  4 Sheets-Sheet 3

INVENTORS.
NORFORD L. OATES
ROBERT I. KARR
BY Robert W. Beach
ATTORNEY

INVENTORS.
NORFORD L. OATES
ROBERT I. KARR
BY
ATTORNEY

United States Patent Office 3,456,287
Patented July 22, 1969

3,456,287
FISH-CLEANING MACHINE DRIVE MECHANISM
Norford L. Oates and Robert I. Karr, Seattle, Wash., assignors to Smith-Berger Manufacturing Corporation, Seattle, Wash., a corporation of Washington
Filed July 28, 1967, Ser. No. 656,748
Int. Cl. A22c *25/14, 25/08*
U.S. Cl. 17—59           10 Claims

ABSTRACT OF THE DISCLOSURE

A first infinitely-variable speed hydraulic motor drives a fish-carrying ring. Rotative belly and back fin cutters, a slitting saw, and rotary gutter, blooder and cleaning brushes are spaced circumferentially around the carrier ring, and at least some of these cleaning implements can be moved toward and away from the cleaning ring. An infinitely-variable speed hydraulic motor separate from the carrier ring drive motor is connected by chains, a countershaft and transition shafts, to drive all of the cleaning implements. Such an implement is mounted on the swinging end of a pivoted arm and the position of such arm end can be adjusted while the machine is in operation by turning a nut carried by the arm's swinging end to move it along a longitudinally-fixed screw. The nut can be turned by turning a bevel gear integral with it, which meshes with another bevel gear mounted on the shank of a manually-rotatable handle.

---

The principal object of this invention is to provide an infinitely-variable speed drive for a fish-cleaning machine which can be regulated quickly and easily during continued operation of the machine for the purpose of cleaning fish with such machine at a rate corresponding to the rate at which fish cleaned by such machine are subsequently processed in a cannery line, including the steps of canning and cooking the fish.

Another object is to alter at will the speed of rotary implements for cleaning the fish, depending upon the size and firmness of the fish so as to clean the fish effectively with minimum loss of flesh and scuffing of the fish walls during cleaning. A further object is to be able to adjust the positions of cleaning implements relative to the path of movement of the fish quickly so that the cleaning implement will be applied to the fish with the proper pressure, depending upon the size of the fish, the speed of fish movement, and the speed of rotation of the cleaning device.

For many years, it has been customary practice in salmon canneries to remove the salmon head on a feeder table and then to carry the beheaded fish around an orbit on a fish-cleaning carrier ring while the belly fin and back fin are cut off, the belly is slit open, the entrails are removed, the blood sac attached to the backbone is scraped out, and the walls of the belly cavity are cleaned by brushing. Such rotary ring cleaning machines are shown, for example, in Patent 998,129 of E. A. Smith for Fish Dressing Machine, Patent 1,034,525 of E. A. Smith for Fish Dressing Machine, and Patent 2,526,150 of N. L. Oates for Fish Cleaning Knife. Such machines are commonly known in the trade as "Iron Chinks."

Figure 1:
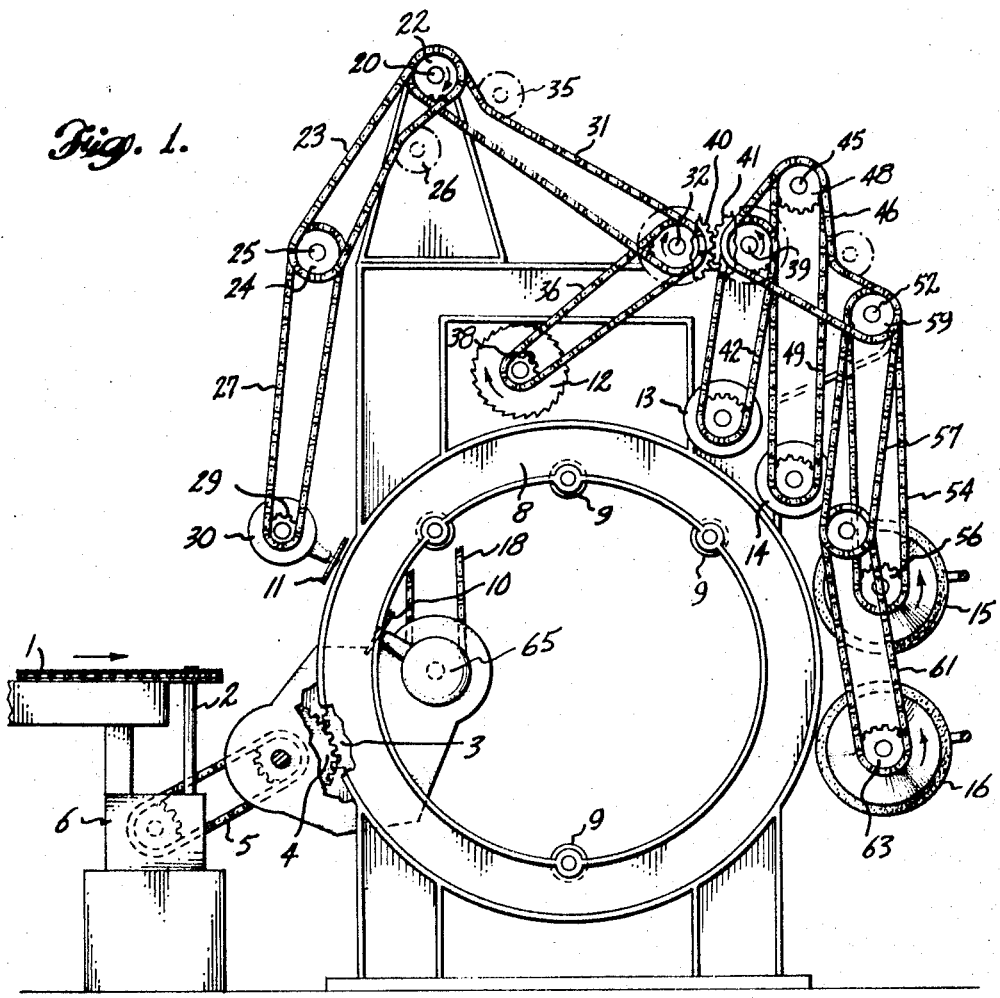
FIGURE 1 is a somewhat diagrammatic side elevation of a rotary fish-carrier ring type of fish-cleaning machine and FIGURE 2 is a side elevation of the same machine viewed from the opposite side of the machine.
Figure 2:
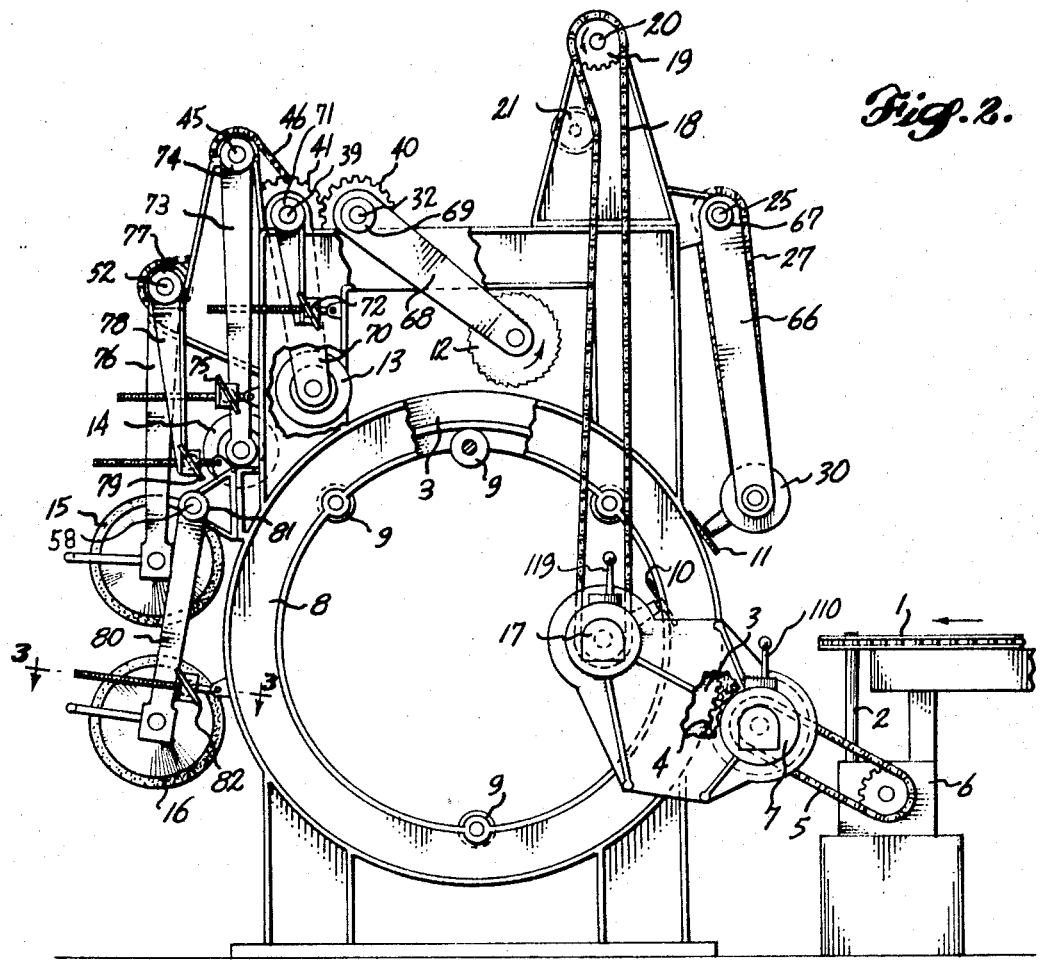
Figure 4:
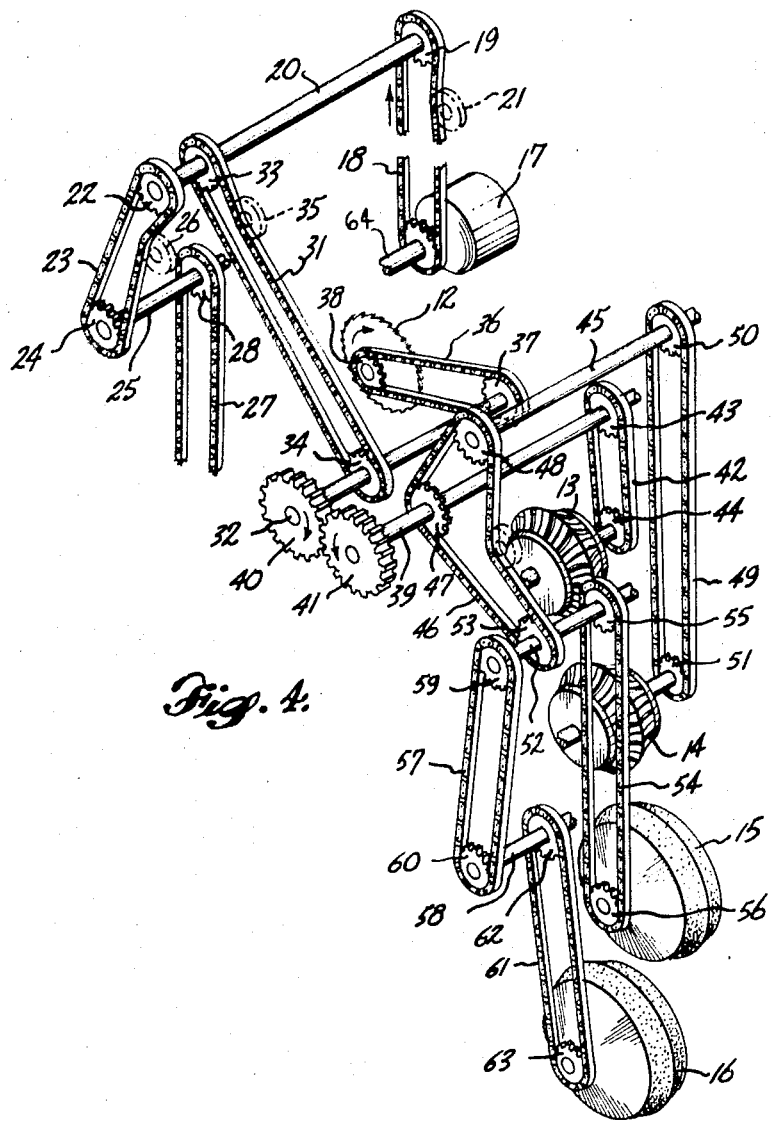
FIGURE 4 is a top perspective of the cleaning implement drive arrangement of the cleaning machine.

The structure of a fish beheading and feeding table and an Iron Chink cleaning machine, which are conventional in most respects, are shown in FIGURES 1, 2 and 4. From the beheading station, the fish is fed along the feed table by laterally-spaced chains 1 driven by sprockets on shafts 2 to the Iron Chink fish-carrying bull rings 3. A drive gear 4 meshing with gear teeth on the periphery of such a bull ring drives chains 5, which are connected through suitable gearing in housing 6 to turn the feed table shafts 2 in synchronism with rotation of the bull rings. The gear 4 is driven by a hydraulic motor 7.

The bull rings 3 are mounted concentrically with the annular frame 8 of the Iron Chink by rollers 9, which support the bull rings for rotation by the gear 4 which is driven by motor 7. The beheaded fish delivered by chains 1 of the feed table to the bull rings are secured between such bull rings to be carried by them orbitally around the machine, tail first, and back inward. The means for securing the fish in this manner are not new and not illustrated in the drawings. By the bull rings each fish is carried past successive cleaning implements located adjacent to the path of travel of the fish around the orbit of the bull rings. Such implements spaced circumferentially around the bull rings include a back fin cutting saw 10, a belly fin cutting saw 11, a belly slitter saw 12, a gutter wheel 13, a blooder wheel 14, and first and second cleaning brushes 15 and 16. All of these cleaning implements are driven in synchronism by the hydraulic motor 17 through the arrangement of drive chains, shafts and sprockets shown principally in FIGURE 4.

The hydraulic motor 17 drives chain 17 to turn sprocket 19, which is carried by a main countershaft 20. The chain 18 is kept tight by a tightener 21. A sprocket 22 carried by the countershaft drives chain 23, engaging sprocket 24 on a transition shaft 25. A tightener 26 maintains chain 23 tight. Chain 27 connects sprocket 28 on transition shaft 25 and sprocket 29 driving gearing in housing 30 to turn the belly fin cutter 11. Chain 31 drives transition shaft 32 by connecting sprocket 33 on countershaft 20 and sprocket 34 on such transition shaft. Chain 31 is kept tight by tightener 35. Chain 36 engaging sprocket 37 on transition shaft 32 drives sprocket 38 to turn the belly slitting saw 12.

Transition shaft 39 is driven in the direction opposite the direction of rotation of shaft 32 by the meshing gears 40 and 41 secured to shafts 32 and 39, respectively. A chain 42 connects sprocket 43 on shaft 39 and sprocket 44 on the shaft of the gutter wheel 13. An addititonal transition shaft 45 is driven by chain 46, which connects sprocket 47 on shaft 39 and sprocket 48 on shaft 45. Chain 49 then connects another sprocket 50 on shaft 45 with sprocket 51 on the shaft of the rotary blooder wheel 14 to turn it. Chain 46 also drives a further transition shaft 52 by engaging sprocket 53 on such shaft. Chain 54 connects sprocket 55 on that shaft with sprocket 56 on the shaft of the first brush 15 to drive it. Chain 57 drives the further transition shaft 58 by connecting sprocket 59 on shaft 52 and sprocket 60 on such further shaft 58. Chain 61 then connects sprocket 62 on such shaft with sprocket 63 on the shaft of the second cleaning brush 16 to turn it.

Shaft 64, shown in FIGURE 4, of motor 17 drives gearing in housing 65, shown in FIGURE 1, to rotate the back fin cutter 10. Such cutter can be mounted in a fixed location because the back of the fish always is transported through the cleaning orbit by the bull rings 3 along a definite path, irrespective of the size of the fish, because the posititon of the fish is established by securing the fish with its back against the bull rings. The position of the belly fin cutter 11 is established by supporting it on an arm 66, shown in FIGURE 2, swingable about a pivot 67 concentric with drive shaft 25. Usually there is no need for adjusting the position of this cutter. The belly slitting saw 12 is mounted on the swinging end of arm 68 supported by a pivot 69 concentric with shaft 32. This saw also need not ordinarily be shifted from its initially-established position.

The other four cleaning implements, namely, the gutter 13, blooder 14, and cleaning brushes 15 and 16, are mounted for individual adjustment toward and away from the bull rings. Thus, the gutter 13 is mounted on the swinging end of arm 70, supported by pivot 71 concentric with shaft 39. The arm 70 can be swung into different positions by adjusting mechanism 72. Blooder 14 is mounted on the swinging end of arm 73 supported by pivot 74 concentric with shaft 45. The position of blooder 14 can be altered by manipulation of adjusting means 75 for swinging arm 73. Brush 15 is mounted on the swinging end of arm 76 supported by pivot 77 concentric with shaft 52. The position of this brush relative to the bull rings can be adjusted by swinging arm 78, which is integral with arm 76, by manipulation of the adjusting means 79 connected to arm 78. The second brush 16 is mounted on the swinging end of arm 80 supported by pivot 81 concentric with shaft 58. The position of this brush relative to the bull rings can be altered by manipulation of the adjusting means 82 connected to arm 80.

Figure 3:
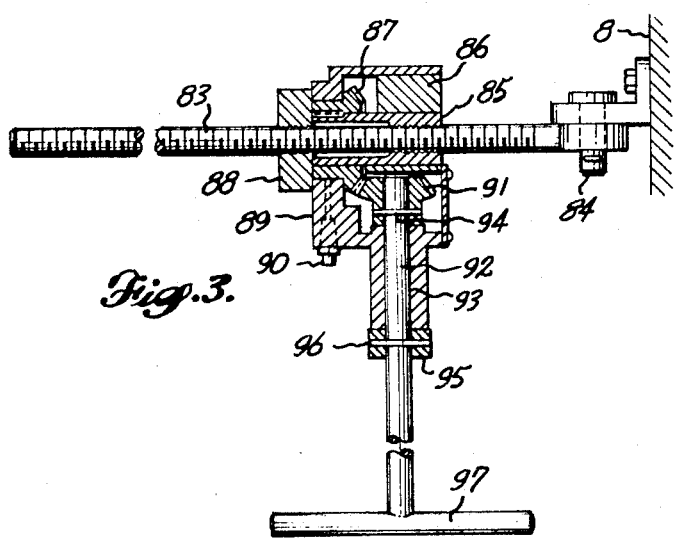
FIGURE 3 is an enlarged detail section of a portion of the machine taken on line 3—3 of FIGURE 2.

All of the adjusting means 72, 75, 79 and 82 are of similar construction, which is shown in detail in FIGURE 3. Such mechanism includes a screw 83 which is mounted swingably by pivot 84 on an appropriate portion of the bull ring frame 8. The screw 83 is thus mounted so that it is free to swing, but is held against longitudinal movement. On this screw is threaded a nut 85 having a cylindrical exterior journalled in bearing 86. A bevel gear 87 extends over the hollow nut shaft 85, and is keyed to it, so that rotation of such bevel gear will effect rotation of the nut. A thrust plate 88 attached to bevel gear 87 resists thrust of such bevel gear and the hollow nut shaft 85 in one direction, and the shoulder of the bevel gear carries the thrust loads in the opposite direction relative to the gear housing 89. The shank of gear 87 also has radial bearing engagement in the gear casing, and a lubrication fitting 90 can be provided to lubricate this bearing.

A bevel gear 91 carried by a shaft 92 meshes with bevel gear 87. Such shaft extends through a bore 93 in the gear housing 89 extending radially of screw 83. The bevel gear 91 is secured to shaft 92 by a pin 94. A collar 95 encircles shaft 92 outwardly of bore 93 and is secured to such shaft by pin 96. A T-handle 97 is provided on the outer end of shaft 92. Manual rotatiton of shaft 92 by manipulation of handle 97 will rotate bevel gear 91, which in turn rotates bevel gear 87 to revolve nut 85. Such turning of the nut will shift the gear casing 89 lengthwise along screw 83 to the left or right, depending upon the direction in which the handle 97 is turned. The gear casing in the case of each of the adjusting means 72, 75, 79 and 82 is attached to the corresponding arm 70, 73, 78 and 80, respectively, so that, as the casing is shifted in one direction or the other along the screw 83, the corresponding arm will be swung to shift the particular fish-cleaning implement toward or away from the bull rings.

Fish are fed to the fish-cleaning machine bull rings from the feed table 1, which, as explained above, is driven by mechanism synchronized in speed with the rotation of the bull rings. From the fish-cleaning machine, the fish progress to the filling line of the cannery. If the speed of the bull rings cannot be changed, large fish may be cleaned faster than they can be accommodated in the filling lines and must be allowed to accumulate somewhere along the filling line. On the contrary, if small fish are being handled by such fixed-speed cleaning mechanism, the filling line would be operated at less than full capacity, which is uneconomical. It is important, therefore, to be able to increase or decrease the speed of the bull rings 3 and feed table 1 so as to clean fish at a speed which is almost precisely synchronized with the speed at which the fish can be processed subsequently in canning.

Also, it is important to be able to alter the speed of the gutter 13, blooder 14 and cleaning brushes 15 and 16 independently of the speed of rotatiton of the bull rings so that their speed can be reduced as may be desirable to minimize abrasion of the fish or increased as may be required to do an effective cleaning job.

Figure 5:
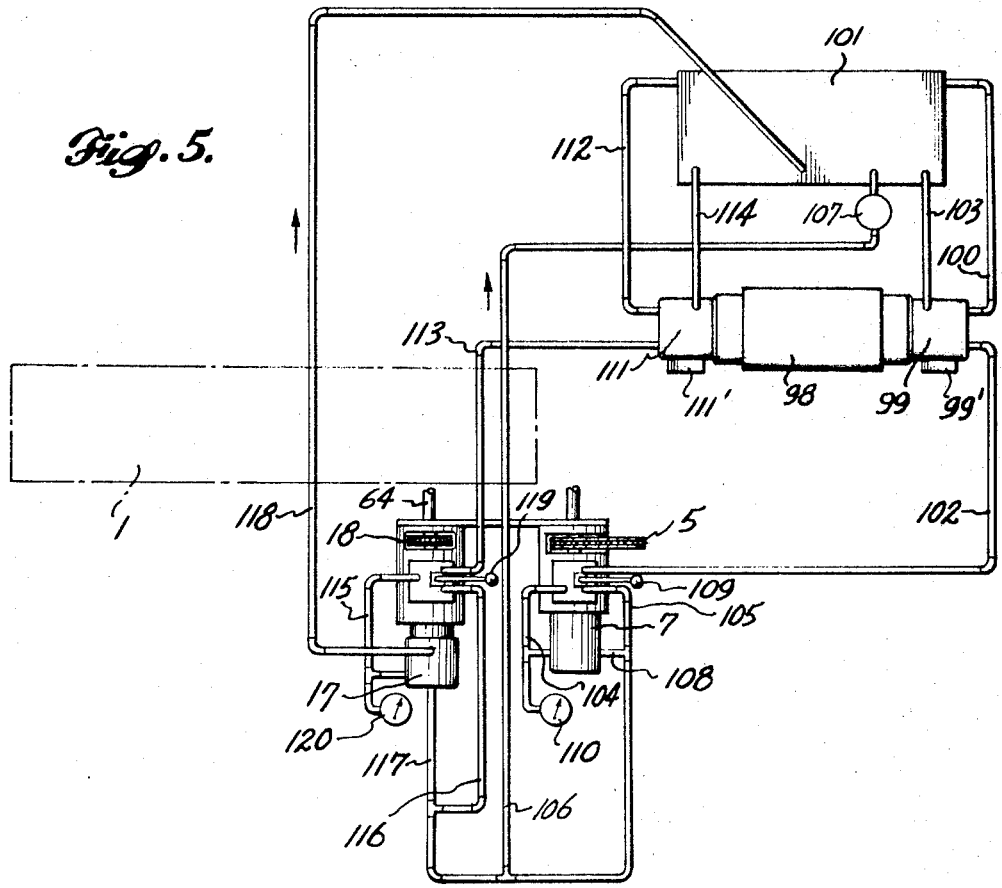
FIGURE 5 is a piping diagram of hydraulic drive mechanism for the fish-carrying ring, and for the rotary fish-cleaning implements.

To enable such operation to be accomplished, the motor 7 for driving the bull rings 3 and feed table 1 is separate from the motor 17 for driving the fish-cleaning implements, and the speed of each of these motors can be regulated very accurately if they are of the hydraulic type, as disclosed in FIGURE 5. Hydraulic liquid is supplied under pressure to both of the motors 7 and 17 from a liquid supply source common to them, but which supply of liquid can be regulated independently for the two motors. Thus, a single pump motor 98 can drive separate variable-displacement pumps by which hydraulic liquid is pumped to the two motors 7 and 17.

Pump 99 driven by motor 98 is connected by a pump supply conduit 100 to a hydraulic fluid reservoir 101. Hydraulic liquid at a predetermined volume is then supplied to the motor control mechanism by pipe 102. The quantity of liquid supplied to this pipe can be regulated by a manually-adjustable regulator 99'. Liquid which leaks past the pump pistons into a sump is returned to the reservoir 101 through pipe 103. From the motor control valve, the liquid flows through pipe 104 to the motor 7 and is returned from the motor to the reservoir through the motor return line 108 and the common return line 106 to which it is connected. A filter 107 can be included in this common return line. A return conduit 105 is also connected between the control valve mechanism and the common return line.

The hydraulic motor 7 can be started by manipulation of the starting handle 109 and the speed of rotation of the motor will be governed by the setting of the pump supply regulator 99'. The load on the motor, bull rings and header table can be indicated by a pressure gage 110 connected to the motor supply pipe 104. By adjusting the pump delivery control 99', the speed of motor 7 can be controlled quickly and accurately to any desired degree.

The motor 98 also drives the pump 111, which is supplied with hydraulic liquid from the reservoir 101 through pipe 112 and delivers liquid to motor 17 through pipe 113. Liquid which leaks past the pump pistons into a sump is returned from the pump to the reservoir through pipe 114. Pipe 113 is connected to the control valve mechanism for motor 17, and from such control valve mechanism liquid flows to the motor through pipe 115. From the motor the liquid returns through pipe 117 to the common return pipe 106. Motor 17 also has a drain line 118 connected from it to the reservoir. Liquid can also return from the valve mechanism to such common return through pipe 116.

The starting and stopping of motor 17 is effected by manipulation of the control handle 119. The speed of this motor, like that of motor 7, is controlled by regulating the supply of liquid delivered by pump 111 to the motor, as determined by the setting of the pump delivery controller 111'. A pressure gage 120 connected to the motor supply pipe 115 will be responsive to the pressure at which the liquid is delivered to the motor and, consequently, its reading will indicate the load on the cleaning implements.

We claim:
1. A fish-cleaning machine comprising rotary bull rings, a plurality of fish-cleaning implements arranged around said bull rings adjacent to their peripheries for engaging fish carried by said bull rings to clean them, infinitely-variable speed drive means connected to rotate said bull rings, and means for adjusting the speed of asid infinitely-variable speed drive means for turning said bull rings at a speed for cleaning fish thereon in synchronism with the speed at which the fish are subsequently processed for canning.

2. The fish-cleaning machine defined in claim 1, in which the infinitely-variable speed drive means includes a hydraulic motor connected to the bull rings and an infinitely-variable delivery pump connected to said motor for supplying hydraulic liquid thereto, the means for adjusting the speed of the infinitely-variable speed drive means being operable to control said pump for varying the delivery of liquid therefrom to said motor.

3. The fish-cleaning machine defined in claim 1, and drive means for the fish-cleaning implements separate from the infinitely-variable speed drive means for the bull rings.

4. The fish-cleaning machine defined in claim 3, in which the drive means for the fish-cleaning implements are of the variable-speed type, and means to adjust the speed of the drive means for the fish-cleaning implements independently of the speed of the bull rings.

5. The fish-cleaning machine defined in claim 4, in which the drive means for the fish-cleaning implements includes a hydraulic motor, a hydraulic pump connected to supply hydraulic liquid to said motor, and means for controlling the delivery of liquid from the pump to the motor of the drive means for the fish-cleaning implements.

6. The fish-cleaning machine defined in claim 2, infinitely-variable speed drive means for the fish-cleaning implements separate from the infinitely-variable speed drive means for the bull rings and including a second hydraulic motor, a second hydraulic pump connected to supply hydraulic liquid to said second motor, and means for controlling the delivery of liquid from said second pump to said second motor.

7. The fish-cleaning machine defined in claim 6, and a drive motor common to the infinitely-variable delivery pump and to the second pump.

8. The fish-cleaning machine defined in claim 3, bull ring mounting means, a plurality of arms swingable relative to said mounting means, each supporting one of the fish-cleaning implements on its swinging end for movement toward and away from the bull rings, and mechanical advantage means operable to vary the spacing between the swinging end of each arm and the bull rings including a handle rotatable to adjust the mechanical advantage means.

9. The fish-cleaning machine defined in claim 8, in which the mechanical advantage means includes a screw and nut connected between the swinging end of an arm and the bull ring mounting means, a first bevel gear connected for rotation with said nut, and a second bevel gear meshing with said first bevel gear and connected to the handle for rotation thereby.

10. A fish-cleaning machine comprising a fish-cleaning implement, fish-carrying means adjacent to said fish-cleaning implement for carrying fish past said fish-cleaning implement so as to be cleaned by such implement during such passage, infinitely-variable speed drive means connected to move said fish-carrier means, and means for adjusting the speed of said infinitely-variable speed drive means for moving said fish-carrier means at a speed for carrying fish thereby in synchronism with the speed at which the fish are subsequently processed for canning.

References Cited
UNITED STATES PATENTS

| | | | |
|---|---|---|---|
| 1,459,273 | 6/1923 | Waugh | 17—3 |
| 1,542,196 | 6/1925 | Waugh | 17—3 |
| 1,819,060 | 8/1931 | Baader | 17—3 |
| 2,239,013 | 4/1941 | Palmer et al. | 17—3 |
| 2,585,267 | 2/1952 | Oates | 17—3 |

LUCIE H. LAUDENSLAGER, Primary Examiner